United States Patent
Kamei et al.

[11] Patent Number: 6,011,887
[45] Date of Patent: Jan. 4, 2000

[54] OPTICAL FIBER CABLE

[75] Inventors: Koji Kamei, Kawasaki; Shigeyoshi Yoshida, Abiko, both of Japan

[73] Assignee: Tokin Corporation, Miyagi, Japan

[21] Appl. No.: 09/068,064

[22] PCT Filed: Aug. 28, 1997

[86] PCT No.: PCT/JP97/03003

§ 371 Date: Apr. 28, 1998

§ 102(e) Date: Apr. 28, 1998

[87] PCT Pub. No.: WO98/09189

PCT Pub. Date: May 3, 1998

[30] Foreign Application Priority Data

Aug. 29, 1996 [JP] Japan ..................... 8-228158

[51] Int. Cl.[7] .................................................. G02B 6/44
[52] U.S. Cl. ..................... 385/103; 385/100; 385/106; 385/112; 385/103
[58] Field of Search ..................... 385/100–114

[56] References Cited

U.S. PATENT DOCUMENTS

| | | | |
|---|---|---|---|
| 4,160,872 | 7/1979 | Lundberg et al. | 385/100 X |
| 5,333,230 | 7/1994 | Hata et al. | 385/110 |
| 5,390,273 | 2/1995 | Rahman et al. | 385/112 |
| 5,448,669 | 9/1995 | Dunne | 385/101 |
| 5,761,361 | 6/1998 | Pfandl et al. | 385/100 |

FOREIGN PATENT DOCUMENTS

| | | |
|---|---|---|
| 02269409 | 11/1990 | European Pat. Off. . |
| 04184816 | 1/1992 | European Pat. Off. . |
| 0675380 | 3/1995 | European Pat. Off. . |
| 0696808 | 2/1996 | European Pat. Off. . |
| 0696808 | 3/1996 | European Pat. Off. . |
| 97937825 | 10/1998 | European Pat. Off. . |
| 9203161 | 6/1992 | Germany . |
| 61-179517 | 11/1986 | Japan . |
| 61-277911 | 12/1986 | Japan . |
| 63-64218 | 3/1988 | Japan . |
| 63-119113 | 5/1988 | Japan . |
| 1576513 | 10/1980 | United Kingdom . |

*Primary Examiner*—Phan T. H. Palmer
*Attorney, Agent, or Firm*—Hopgood, Calimafde, Kalil & Judlowe

[57] ABSTRACT

In an optical fiber cable, for effectively suppressing undesired radiant noise propagating in a reinforcing wire or generated from the reinforcing wire without providing an electromagnetic shielding member apart from the optical fiber cable, a buffer layer and an outer jacket of an LAP sheath covering the reinforcing wire being a tension member forming the optical fiber cable are constituted by composite magnetic bodies, respectively, composed of soft magnetic powder and organic binding agents. It is preferable that the soft magnetic powder is powder being essentially flat.

9 Claims, 2 Drawing Sheets

PRIOR ART

OPTICAL FIBER CABLE

TECHNICAL FIELD

The present invention relates to an optical fiber cable and, in particular, to an optical fiber cable having a reinforcing wire for reinforcement in addition to an optical fiber core wire.

BACKGROUND ART

As is well known, an optical fiber is a fibrous light wave guide made of glass or the like, and has a structure composed of a central portion called a core and a peripheral portion called a clad, wherein the refractive index of the central portion is set greater than that of the peripheral portion for light confinement. The optical fiber has excellent properties, such as a small diameter, a light weight and non-induction.

However, since the optical fiber itself is made of a very brittle material, such as glass, when used as a long-distance communication cable, it is not used by itself. For example, when the optical fiber is used as a submarine cable, since the submarine cable is exposed to a very severe environment, it is necessary to protect the optical fiber from such a severe external force so as to maintain a stable transmission characteristic thereof.

For this reason, the optical fiber is covered with several layers. First, immediately after wire drawing of the optical fiber, a primary cover of plastic or the like is applied. The optical fiber in this state is called an optical fiber wire. The optical fiber wire covered with a buffer layer and a secondary cover is called an optical fiber core wire.

The optical fiber cable comprises at least one optical fiber core wire, a reinforcing wire made of a conductor extending close to the optical fiber core wire and along a longitudinal direction of the optical fiber core wire, and an external covering member containing an insulating material and covering the optical fiber core wire and the reinforcing wire.

FIG. 1 shows an example of a conventional optical fiber cable 10'. The shown optical fiber cable 10' comprises a tension member (for example, made of a copper wire) 11 working as a reinforcing wire at a central portion thereof, twelve optical fiber core wires 13 arranged in symmetry around the tension member 11 via a pipe 12, a buffer layer 14' covering the optical fiber core wires 13, a presser winding 15 covering the buffer layer 14', and an LAP (Laminated Aluminum Polyethelene) sheath 16' provided around the presser winding 15. The LAP sheath 16' has a coating structure in which a polyethylene coat and an aluminum tape at its inner side are unified through bonding so as to have a moisture-proof effect. For the buffer layer 14', silicon resin, for example, is used. The buffer layer 14' and the polyethylene outer jacket of the LAP sheath 16' work as external coating members. Some of the optical fiber core wires 13 may be replaced with intervenient core wires.

FIG. 2 shows another example of a conventional optical fiber cable 20'. The shown optical fiber cable 20' is called a self-supporting optical fiber cable and uses, instead of the tension member 11 shown in FIG. 1, a supporting wire or a suspending wire in which an outer cover 27' covers the circumferences of seven lead wires (for example, made of copper wires) 21. Further, a signal transmission wire is provided apart from the suspending wire or the supporting wire. In the signal transmission wire, seven optical fiber core wires 23 are provided at a central portion thereof, the optical fiber core wires 23 are covered with a buffer layer 24, the buffer layer 24 is covered with an aluminum tape 25, and the aluminum tape 25 is covered with a PE (polyethylene) sheath 26. The signal transmission wire and the lead wires 21 covered with the outer cover 27' are unified in a mutually contacting state by a lashing wire 28. The lead wires 21 work as reinforcing wires, and the outer cover 27', the buffer layer 24 and the PE sheath 26 work as external covering members.

The optical fiber core wires 13 or 23 do not suffer an influence of electromagnetic induction. However, since the reinforcing wires 11 and 21 suffer the influence of the electromagnetic induction, noise may ride on the reinforcing wires 11 and 21 so that undesired radiant noise may propagate in the reinforcing wires or may be generated from the reinforcing wires. Since the buffer layer 14', the polyethylene outer jacket of the LAP sheath 16' and the outer cover 27' are made of resin, the undesired radiant noise can not be shielded.

Accordingly, conventionally, for shielding the undesired radiant noise, the optical fiber cable 10' or 20' is covered with a shielding sheath wire or an EMI (electromagnetic interference) core is provided. Specifically, an electromagnetic shielding member is provided apart from the optical fiber cable 10' or 20'.

Therefore, an object of the present invention is to provide an optical fiber cable which can effectively suppress undesired radiant noise propagating in a reinforcing wire or generated from the reinforcing wire, without providing an electromagnetic shielding member apart from the optical fiber cable.

DISCLOSURE OF THE INVENTION

For accomplishing the foregoing object, according to the present invention, as recited in claim 1, there is obtained an optical fiber cable comprising at least one optical fiber core wire, a reinforcing wire made of a conductor extending close to the optical fiber core wire and in a longitudinal direction of and along the optical fiber core wire, and an external covering member containing an insulating material and covering the optical fiber core wire and the reinforcing wire, wherein the optical fiber cable is characterized in that a layer of at least a part of the external covering member between its inner surface and its outer surface comprises a composite magnetic body composed of soft magnetic powder and an organic binding agent.

Aspects and modifications of the optical fiber cable of this type will be clearly apparent from the specification and the appended claims.

According to the present invention, as recited in claim 5, there is obtained a self-supporting optical fiber cable comprising a supporting wire comprising at least one lead wire and an outer cover covering the circumference thereof, an optical fiber signal transmission wire comprising at least one optical fiber core wire and a covering member covering the circumference thereof, and a lashing wire wound around the circumferences of the supporting wire and the optical fiber signal transmission wire to couple the supporting wire and the optical fiber signal transmission wire in a mutually parallel state, the self-supporting optical fiber cable characterized in that the outer cover of the supporting wire is constituted by a composite magnetic body composed of soft magnetic powder and an organic binding agent.

Kinds of organic binding agents and kinds and properties of soft magnetic powder in composite magnetic materials to be used in the present invention are disclosed and claimed herein.

Since the external covering member surrounding the circumference of the reinforcing wire in the optical fiber cable is constituted by the composite magnetic body composed of the soft magnetic powder and the organic binding agent, undesired radiant noise electromagnetically induced in the reinforcing wire can be absorbed by the soft magnetic powder.

BEST MODE FOR CARRYING OUT THE INVENTION

Now, the present invention will be described in detail with reference to the drawings.

Figure 1:
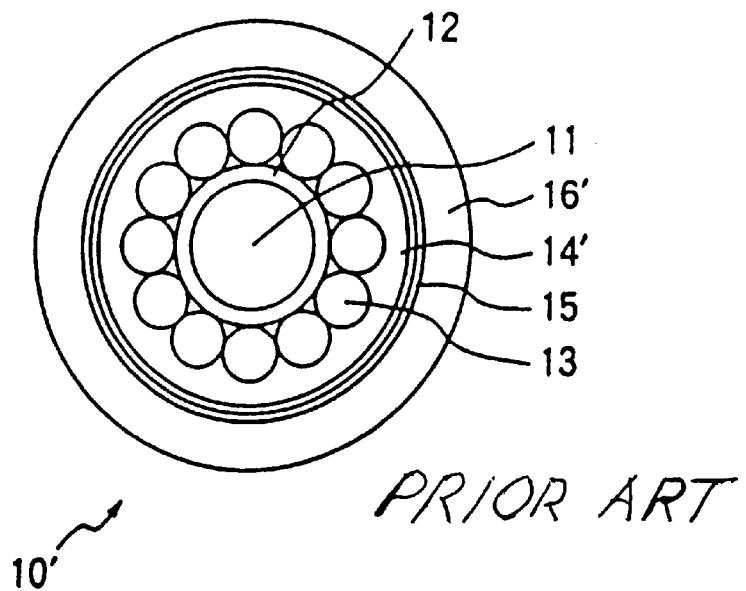
FIG. 1 is a sectional view showing an example of a conventional optical fiber cable.
Figure 3:
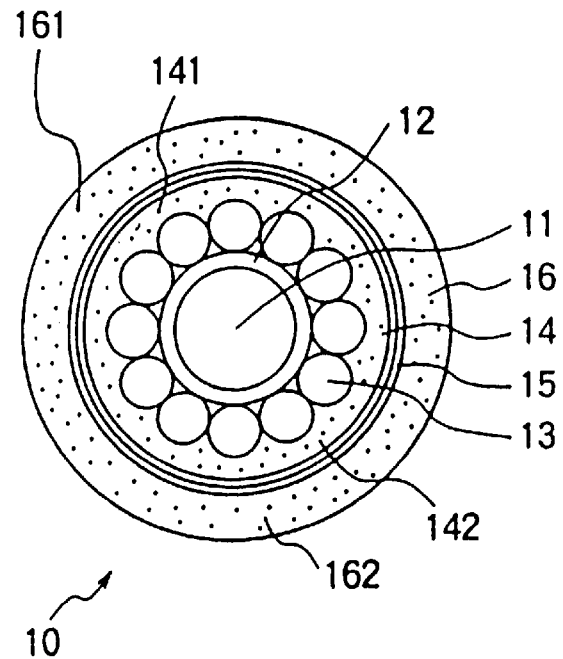
FIG. 3 is a sectional view showing an optical fiber cable according to a first embodiment of the present invention.

Referring to FIG. 3, an optical fiber cable 10 according to the first embodiment of the present invention has the same structure as that shown in FIG. 1 except that constituent materials of a buffer layer and an outer jacket of an LAP sheath working as external covering members differ therefrom. Therefore, reference signs of 14 and 16 are assigned to the buffer layer and the LAP sheath, respectively. The same reference signs are assigned to those which are the same as those shown in FIG. 1 so as to omit explanation thereof.

As described before, in the conventional optical fiber cable 10' shown in FIG. 1, the buffer layer 14' and the outer jacket of the LAP sheath 16' are made of only the resin materials, respectively. On the contrary, in the optical fiber cable 10 according to this embodiment, the buffer layer 14 is constituted by a composite magnetic body composed of soft magnetic powder 141 and an organic binding agent 142, and the outer jacket of the LAP sheath 16 is also constituted by a composite magnetic body composed of soft magnetic powder 161 and an organic binding agent 162. It is preferable that the soft magnetic powder 141 and 161 be essentially flat.

As the organic binding agent 142 of the buffer layer 14, the same resin material as that forming the buffer layer 14' shown in FIG. 1 can be used. Also, as the organic binding agent 162 of the outer jacket of the LAP sheath 16, the same resin material as that forming the outer jacket of the LAP sheath 16' shown in FIG. 1, that is, polyethylene, can be used. As an organic binding agent suitable for a composite magnetic body, thermoplastic resin, such as polyester resin, polyvinyl chloride resin, polyvinyl butyral resin, polyurethane resin, cellulose resin, nitrile-butadiene rubber or stylene-butadiene rubber, or a polymer thereof can be cited.

On the other hand, as the soft magnetic powder 141 of the buffer layer 14 and the soft magnetic powder 161 of the outer jacket of the LAP sheath 16, an Fe-Al-Si alloy (this is called Sendust (trademark)) or an Fe-Ni alloy (Permalloy) having a large high frequency permeability can be cited as a typical material thereof. The soft magnetic powder 141 and 161 is used by oxidizing the finely powdered surfaces thereof. It is preferable that an aspect ratio of the magnetic powder 14 is sufficiently large (for example, approximately not less than 5:1).

As described above, since the tension member 11 working as a reinforcing wire is covered with the external covering members constituted by the composite magnetic bodies composed of the organic binding agents 142 and 162 containing the soft magnetic powder 141 and 161, respectively, undesired radiant noise radiated from the tension member 11 is absorbed by the soft magnetic powder 141 and 161 so that the undesired radiant noise from the tension member 11 can be suppressed. Further, by rendering essentially flat the shape of the soft magnetic powder 141 and 161, the undesired radiant noise radiated from the tension member 11 can be absorbed and suppressed more efficiently. This is because if the shape of the soft magnetic powder 141 and 161 is essentially flat, a shape anisotropy appears so that a complex permeability based on a magnetic resonance is increased at a high frequency region.

In the foregoing embodiment, the buffer layer 14 and the outer jacket of the LAP sheath 16 are both constituted by the composite magnetic bodies. However, only one of the buffer layer 14 and the outer jacket of the LAP sheath 16 may be constituted by the composite magnetic body.

Figure 2:
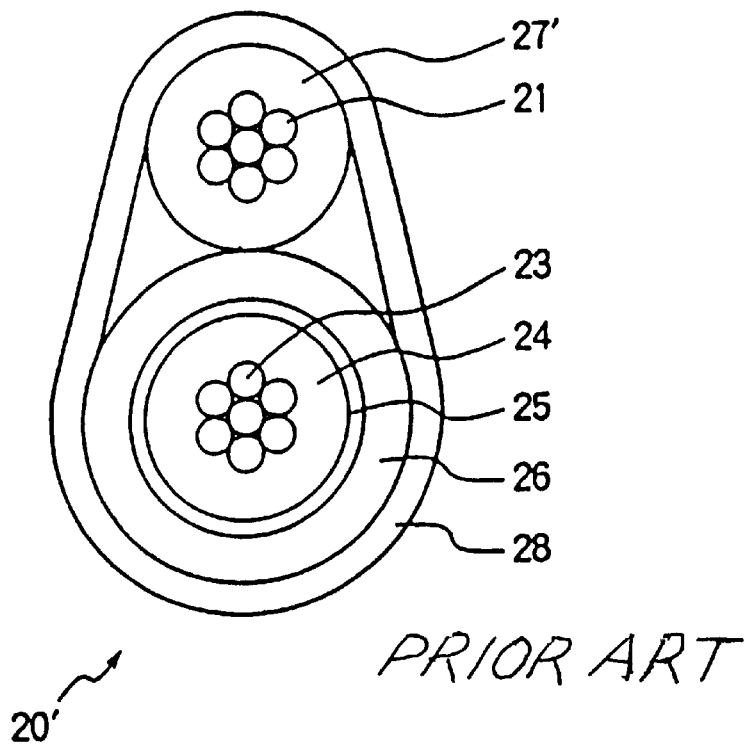
FIG. 2 is a sectional view showing another example of a conventional optical fiber cable.
Figure 4:
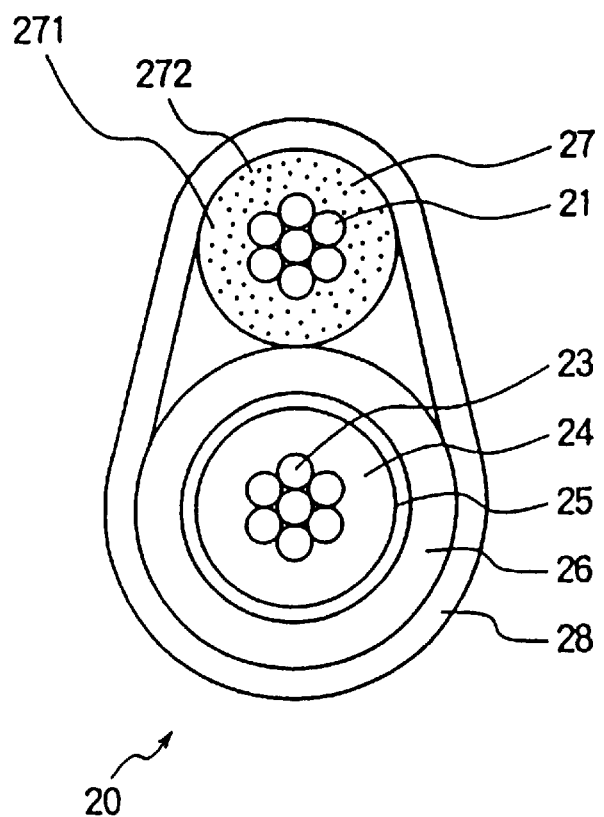
FIG. 4 is a sectional view showing an optical fiber cable according to a second embodiment of the present invention.

Referring to FIG. 4, an optical fiber cable 20 according to the second embodiment of the present invention has the same structure as the self-supporting optical fiber cable shown in FIG. 2 except that a constituent material of an outer cover covering the circumferences of lead wires 21 in a suspending wire or a supporting wire differs therefrom. Therefore, a reference sign of 27 is assigned to the outer cover. The same reference signs are assigned to those which are the same as those shown in FIG. 2 so as to omit explanation thereof.

As described before, in the conventional optical fiber cable 20' shown in FIG. 2, the outer cover 27' covering the circumferences of the lead wires 21 is made of only the resin material. On the contrary, in the optical fiber cable 20 according to this embodiment, the outer cover 27 covering the circumferences of the lead wires 21 is constituted by a composite magnetic body composed of soft magnetic powder 271 and an organic binding agent 272. It is preferable that the soft magnetic powder 271 is essentially flat.

As the organic binding agent 272 of the outer cover 27, the same resin material as that forming the outer cover 27' shown in FIG. 2 can be used. Naturally, the previously enumerated organic binding agents can be used. As the soft magnetic powder 271, the same soft magnetic powder as the foregoing soft magnetic powder 141 and 161 can be used.

The thus structured optical fiber cable 20 achieves an electromagnetic wave absorption effect similar to that of the optical fiber cable 10 shown in FIG. 3.

While the present invention has been described by citing some embodiments, it is needless to say that the present invention is not limited to the foregoing embodiments, but can be modified in various ways without departing from the gist of the present invention. Specifically, an optical fiber cable applied with the present invention is not limited to the structures shown in the embodiments, but can cover a structure including at least one optical fiber core wire, a reinforcing wire made of a conductor, and an external coating member containing an insulating material for coating them.

Industrial Applicability

As described above, since an external covering member forming an optical fiber cable according to the present invention is constituted by a composite magnetic body composed of soft magnetic powder and an organic binding agent, there can be provided an optical fiber cable suppressing undesired radiant noise generated from a reinforcing wire.

We claim:

1. An optical fiber cable including at least one optical fiber core wire, a reinforcing wire made of a conductor extending close to the optical fiber core wire and in a longitudinal direction of and along the optical fiber core wire, and an external covering member containing an insulating material for coating said optical fiber core wire and said reinforcing wire, said optical fiber cable characterized in that a layer of at least a part of said external covering member between its inner surface and its outer surface is constituted by a composite magnetic body composed of soft magnetic powder and an organic binding agent.

2. An optical fiber cable of claim 1, characterized in that a plurality of the optical fiber core wires are arranged around said reinforcing wire and along said reinforcing wire, and said external covering member is arranged outside said plurality of optical fiber core wires.

3. An optical fiber cable of claim 2, characterized in that said external covering member has two layers of an inner-side buffer layer and an LPA sheath layer at its outer side, and at least one of said two layers is constituted by said composite magnetic body.

4. An optical fiber cable of claim 3, characterized in that a presser winding is interposed between said inner-side buffer layer and said outer-side LPA sheath layer.

5. A self-supporting optical fiber cable including a supporting wire comprising at least one lead wire and an outer cover covering the circumference thereof, an optical fiber signal transmission wire comprising at least one optical fiber core wire and a cover member covering the circumference thereof, and a lashing wire wound around the circumferences of said supporting wire and said optical fiber signal transmission wire to couple said supporting wire and said optical fiber signal transmission wire in a mutually parallel state, said self-supporting optical fiber cable characterized in that the outer cover of said supporting wire is constituted by a composite magnetic body composed of soft magnetic powder and an organic binding agent.

6. An optical fiber cable as recited in any one of claims 1 to 5, characterized in that said organic binding agent is thermoplastic resin among polyester resin, polyvinyl chloride resin, polyvinyl butyral resin, polyurethane resin, cellulose resin, nitrile-butadiene rubber and stylene-butadiene rubber, or a polymer thereof.

7. An optical fiber cable as recited in any one of claims 1 to 5, characterized in that said soft magnetic powder is powder being essentially flat.

8. An optical fiber cable as recited in any one of claims 1 to 5, characterized in that said soft magnetic powder is an Fe-Al-Si alloy or an Fe-Ni alloy having a large high frequency permeability.

9. An optical fiber cable as recited in any one of claims 1 to 5, characterized in that said soft magnetic powder is oxidized on surfaces thereof.

* * * * *